(12) United States Patent
Hayakawa et al.

(10) Patent No.: US 10,996,363 B2
(45) Date of Patent: May 4, 2021

(54) METAL DETECTION APPARATUS

(71) Applicant: ANRITSU INFIVIS CO., LTD., Kanagawa (JP)

(72) Inventors: Yuki Hayakawa, Kanagawa (JP); Eiji Taniguchi, Kanagawa (JP); Akira Ohashi, Kanagawa (JP); Tomohiko Yamaguchi, Kanagawa (JP)

(73) Assignee: ANRITSU INFIVIS CO., LTD., Kanagawa (JP)

( * ) Notice: Subject to any disclaimer, the term of this patent is extended or adjusted under 35 U.S.C. 154(b) by 0 days.

(21) Appl. No.: 16/487,172

(22) PCT Filed: May 22, 2018

(86) PCT No.: PCT/JP2018/019720
§ 371 (c)(1),
(2) Date: Aug. 20, 2019

(87) PCT Pub. No.: WO2018/216702
PCT Pub. Date: Nov. 29, 2018

(65) Prior Publication Data
US 2020/0073007 A1 Mar. 5, 2020

(30) Foreign Application Priority Data
May 26, 2017 (JP) .............................. JP2017-104099

(51) Int. Cl.
*G01V 3/10* (2006.01)
*G01N 27/72* (2006.01)

(52) U.S. Cl.
CPC ............. *G01V 3/104* (2013.01); *G01N 27/72* (2013.01)

(58) Field of Classification Search
CPC . G01V 3/104; G01V 3/10; G01V 3/08; G01V 3/38; G01V 13/00; G01N 27/72
See application file for complete search history.

(56) References Cited

U.S. PATENT DOCUMENTS 5,304,927 A 4/1994 Thomas et al.
5,642,050 A * 6/1997 Shoemaker ............ G01V 3/105
324/232

(Continued)

FOREIGN PATENT DOCUMENTS

JP 2001-074851 A 3/2001
JP 2002-168965 A 6/2002

(Continued)

OTHER PUBLICATIONS

L. S. Kharangate, N. Guinde and A. Tamba, "A novel approach for metal detection in food using curve fitting technique," 2017 2nd IEEE International Conference on Recent Trends in Electronics, Information & Communication Technology (RTEICT), Bangalore, May 19-20, 2017 (Year: 2017).*

(Continued)

*Primary Examiner* — Daniel R Miller
(74) *Attorney, Agent, or Firm* — Pearne & Gordon LLP

(57) ABSTRACT

A metal detection apparatus comprises: a detection circuit unit (30) that detects a first variation component having a large influence of workpiece and a second variation component having a large influence of metal; a determination unit (40) that compares the two variation components to perform a metal determination process in the workpiece (W); and a detection condition adjustment unit (60) that adjusts detection conditions of both variation components. A foreign matter waveform storage unit (50) stores a test variation component accompanying temporal change due to metal influence is further provided. The detection condition adjustment unit sets a specific processing condition of detection processing in the detection circuit unit based on the first variation component based on the magnetic field variation signal at the time when the work W including no metal passes through the inspection zone Z and the second variation component constituted by the test variation component.

19 Claims, 8 Drawing Sheets

(56) References Cited

U.S. PATENT DOCUMENTS

| | | | | | |
|---|---|---|---|---|---|
| 5,929,634 | A | * | 7/1999 | Artinger | G01V 3/104 324/233 |
| 2002/0093338 | A1 | * | 7/2002 | Rowan | G01V 3/104 324/329 |
| 2009/0167299 | A1 | * | 7/2009 | Nishio | G01V 3/104 324/239 |
| 2012/0086455 | A1 | * | 4/2012 | McAdam | G01V 3/107 324/326 |
| 2012/0206138 | A1 | * | 8/2012 | Derungs | G01V 3/107 324/258 |
| 2018/0136152 | A1 | * | 5/2018 | Butterworth | G01V 3/104 |

FOREIGN PATENT DOCUMENTS

| | | | |
|---|---|---|---|
| JP | 2005-345433 | A | 12/2005 |
| JP | 2006-038636 | A | 2/2006 |
| JP | 2008-267869 | A | 11/2008 |

OTHER PUBLICATIONS

Y. Zhao, W. Yin, C. Ktistis, D. Butterworth and A. J. Peyton, "On the Low-Frequency Electromagnetic Responses of In-Line Metal Detectors to Metal Contaminants," in IEEE Transactions on Instrumentation and Measurement, vol. 63, No. 12, pp. 3181-3189, Dec. 2014 (Year: 2014).*

International Search Report Issued in Patent Application No. PCT/JP2018/019720 dated Aug. 28, 2018.

Written Opinion Issued in Patent Application No. PCT/JP2018/019720 dated Aug. 28, 2018.

\* cited by examiner

METAL DETECTION APPARATUS

BACKGROUND OF THE INVENTION

Field of the Invention

The present invention relates to a metal detection apparatus, and more specifically relates to a metal detection apparatus that detects a metal or a metal component in an article to be inspected based on the magnetic field variation when the article passes through an alternating magnetic field.

Description of the Related Art

Conventionally, metal detection apparatuses, in which an alternating magnetic field is generated in an inspection zone, a magnetic field variation due to an influence of an article to be inspected moving in the inspection zone is detected, and a metal is detected by using a signal obtained by performing detection processing on the detection signal, are widely used as versatile apparatuses for any metal species.

In such a metal detection apparatus, a sample of article containing foreign matter is prepared by using a test piece corresponding to a metal of a size to be detected, and the sample of article containing foreign matter is fed into the metal detection apparatus, thereby confirming the detection sensitivity and facilitating the setting.

As this kind of metal detection apparatus, for example, there is a metal detection apparatus which selects and sets forth a magnetic field frequency according to the species of the metal to be detected and the constituent material of the workpiece, finds a degree of influence on the article based on a detection signal of a plurality of metallic foreign matters of various sizes and a detection signal of good article, estimates a detection sensitivity of the detection means in the case that metal foreign matter is contaminated in the article under inspection by a sensitivity estimation means and sets forth the detection sensitivity of the detection means based on the size of a specified metal foreign matter and the detection sensitivity of estimated by the sensitivity estimation means (See, for example, Patent Document 1).

CITATION LIST

Patent Literature

Patent Document 1: Japanese Patent Application Laid-Open No. 2005-345433

SUMMARY OF THE INVENTION

Technical Problem

In the above-described conventional metal detection apparatus, the magnetic field variation due to the movement of the article to be inspected in the inspection zone varies depending on the article to be inspected and the type of metal that can be contaminated therein, and the phase in which the respective influences largely affect the detection signal of the magnetic field variation may also vary.

However, in the conventional metal detection apparatus, since the relative ratio corresponding to the variation range between the detection signal of the metallic foreign article in the detection phase peculiar to the metal influence and the detection signal of the good inspection article is stored, the stored foreign article information does not include the temporal change information, thereby disabling an effective use of the foreign matter information stored in advance, in the case that a high detection sensitivity setting with differences of the respective frequencies and phases between the variation component due to the article influence and the variation component due to the metal influence in the magnetic field variation signal taken into consideration is desired.

Therefore, in order to respond to recent high sensitivity detection requirements, it is necessary to repeat the test of passing the product as a test article through the metal detection apparatus a plurality of times and further to repeat a test of making a joint use of a test piece of metallic foreign matter a plurality of times and then to adjust the detection frequency and the detection phase so that the influence of the article to be inspected is small and the influence of the metallic foreign matter tends to be large, thereby making the sensitivity setting operation for obtaining required detection sensitivity laborious and time-consuming operation with many times of tests.

Further, in the case of frozen products or the like, there are cases that it is impossible to increase the number of tests due to a problem that the state of the article to be inspected changes and the reliability of the test result decreases as the number of times of tests increases and the like. In such cases, it is inevitable to increase the number of articles used for the test, or it is difficult to set the desired high detection sensitivity because it is necessary to suppress the number of tests.

The present invention has been made to solve such a conventional unsolved problem, and it is an object of the present invention to provide a metal detection apparatus capable of quickly and accurately setting a high detection sensitivity and achieving the both of securing the required detection sensitivity and reducing the number of times of the tests at the same time.

Means to Solve the Problem

In order to achieve the above object, the present invention provides a metal detection apparatus, comprises: a magnetic field generation unit that generates an alternating magnetic field in an inspection zone through which an article to be inspected passes; a magnetic field detection unit that detects a variation of the alternating magnetic field at the time when the article to be inspected passes through the inspection zone and outputs a magnetic field variation signal; a detection circuit unit that performs a detection process of detecting a first variation component of the magnetic field variation signal having a large influence of the article to be inspected and a second variation component of the magnetic field variation signal having a large influence of metal, respectively in a different phase; a determination unit that compares the first variation component and the second variation component detected by the detection circuit unit, and performs a determination process for metal detection in the article to be inspected; and a detection condition adjustment unit that adjusts a condition of the detection process of each of the first variation component and the second variation component, wherein the metal detection apparatus further comprises a metal influence signal storage unit that stores in advance a test variation component of the magnetic field variation signal accompanying a temporal change due to an influence of a test piece in the magnetic field variation signal at the time when only the test piece of the metal passes through the inspection zone, and the detection condition adjustment unit sets a specific process condition of the detection process in the detection circuit unit, based on the first variation component based on the magnetic field variation signal at the time when the article to be inspected passes through the inspection zone and the second variation component constituted by the test variation component read out from the metal influence signal storage unit.

By this configuration, in the present invention, when a product to be an article to be inspected is fed into the inspection zone for setting the detection sensitivity, the first variation component having a small metal influence is obtained by the detection condition adjustment unit based on the magnetic field variation signal at the time when the article to be tested passes through the inspection zone, and the second variation component based on the magnetic field variation signal in a case that the test piece is used is obtained from the magnetic field variation signal corresponding to the metal influence data which is read out from the metal influence signal storage unit, and the specific processing condition of the detection process in the detection circuit unit is variably set based on the both variable components. Therefore, it is possible to quickly and accurately set the detection sensitivity capable of meeting the high detection sensitivity requirement by only a small number of tests of only the article without repeating the test of using the article and the test piece together, and it is possible to provide a metal detection apparatus that can achieve both the securing of the required detection sensitivity and the reduction of the number of tests for setting the detection sensitivity.

The metal detection apparatus according to the present invention may be so configured that, the detection circuit unit includes a filter that removes a noise component from a detection signal of the magnetic field variation signal, and the detection condition adjustment unit estimates a detection sensitivity of the metal based on the first variation component based on the magnetic field variation signal at the time when the article to be inspected passes through the inspection zone and the second variation component based on the magnetic field variation signal when the test piece was used as the metal, in a predetermined metal presence or absence determination phase, and variably sets a property of the filter so that the estimated value of the detection sensitivity is equal to or larger than a sensitivity value set in advance.

By this configuration, stable and favorable detection sensitivity can be secured by variably setting the properties of the filters that remove the noise component from the quadrature detection signal of the magnetic field variation signal and by surely making the amplitude level of the magnetic field variation component due to the article influence larger than the detection level of the noise component, for example, in the phase for determining presence of metal.

The metal detection apparatus according to the present invention may be so configured that, the metal influence signal storage unit stores a metal influence data corresponding to the respective magnetic field variation signal at the time when the test piece passes a plurality of different pass positions in the inspection zone, and the detection condition adjustment unit generates a plurality of pseudo magnetic field variation signals in a case that the article to be inspected includes the metal, by adding the second variation component based on the magnetic field variation signals respectively at the time when the test piece passes a plurality of different positions in the inspection zone to the first variation component at the time when the article to be inspected is at a corresponding pass section.

By this configuration, since the metal influence data using the test piece is prepared in advance for the plurality of pass positions in the inspection zone, although the position of the metal to be detected cannot be predicted, a stable detection sensitivity setting is possible.

In the metal detection apparatus according to the present invention, the plurality of pass positions may preferably be spaced apart in at least one of: a passing direction of the article to be inspected; a vertical direction in the inspection zone; and a horizontal direction in the inspection zone.

By this configuration, in the case that the tendency of the position of the metal to be detected can be predicted, the metal influence data using the test piece can be prepared in advance, and in the case where the tendency of the position of the metal cannot be predicted, stable and favorable detection sensitivity setting for all contaminated situations of metallic foreign matter can be set by isotropically arranging a plurality of pass positions in the inspection zone.

In the metal detection apparatus according to the present invention, the metal influence signal storage unit may store the metal influence data for a plurality of types of test pieces having different metal species or different sizes.

By this configuration, even if the type or size of the metal to be detected changes or cannot be predicted, it is possible to stably and favorably set the detection sensitivity.

The detection condition adjustment unit may select and set the frequency of the alternating magnetic field from among a plurality of magnetic field frequency values set in advance, so that the amplitude level of the first variation component based on the magnetic field variation signal increases at the time when the article to be inspected passes through the inspection zone.

By this configuration, it is possible to select a magnetic field frequency having a large metal influence in the magnetic field variation signal, thereby making it possible to set a stable and more favorable detection sensitivity. Further, it is possible to set a stable and more favorable detection sensitivity even in the case that the magnetic field frequency suitable for detecting the second variation component differs depending on whether the metal is magnetic or not.

The metal detection apparatus according to the present invention may be so configured that the metal influence signal storage unit is capable of additionally storing metal influence data corresponding to the magnetic field variation signal at the time when a new test piece passes through the inspection zone, and the detection condition adjustment unit additionally stores, as a property of the filter, a property in which the estimated value of the detection sensitivity is equal to or larger than the predetermined value as a selectable property, and selects the property in which the estimated value of the detection sensitivity is the maximum value from among a plurality of properties of the filter.

By this construction, it is possible to respond quickly and accurately to a new detection sensitivity request corresponding to a new test piece.

Effect of the Invention

According to the present invention, there is provided a metal detection apparatus capable of quickly and accurately setting a high detection sensitivity and achieving the both of securing the required detection sensitivity and reducing the number of times of the testing at the same time.

DETAILED DESCRIPTION OF THE INVENTION

Hereinafter, embodiments for carrying out the present invention will be described with reference to the drawings.

FIGS. 1 to 6 show schematic configurations of a metal detection apparatus according to an embodiment of the present invention.

First, the configuration will be described.

Figure 1:
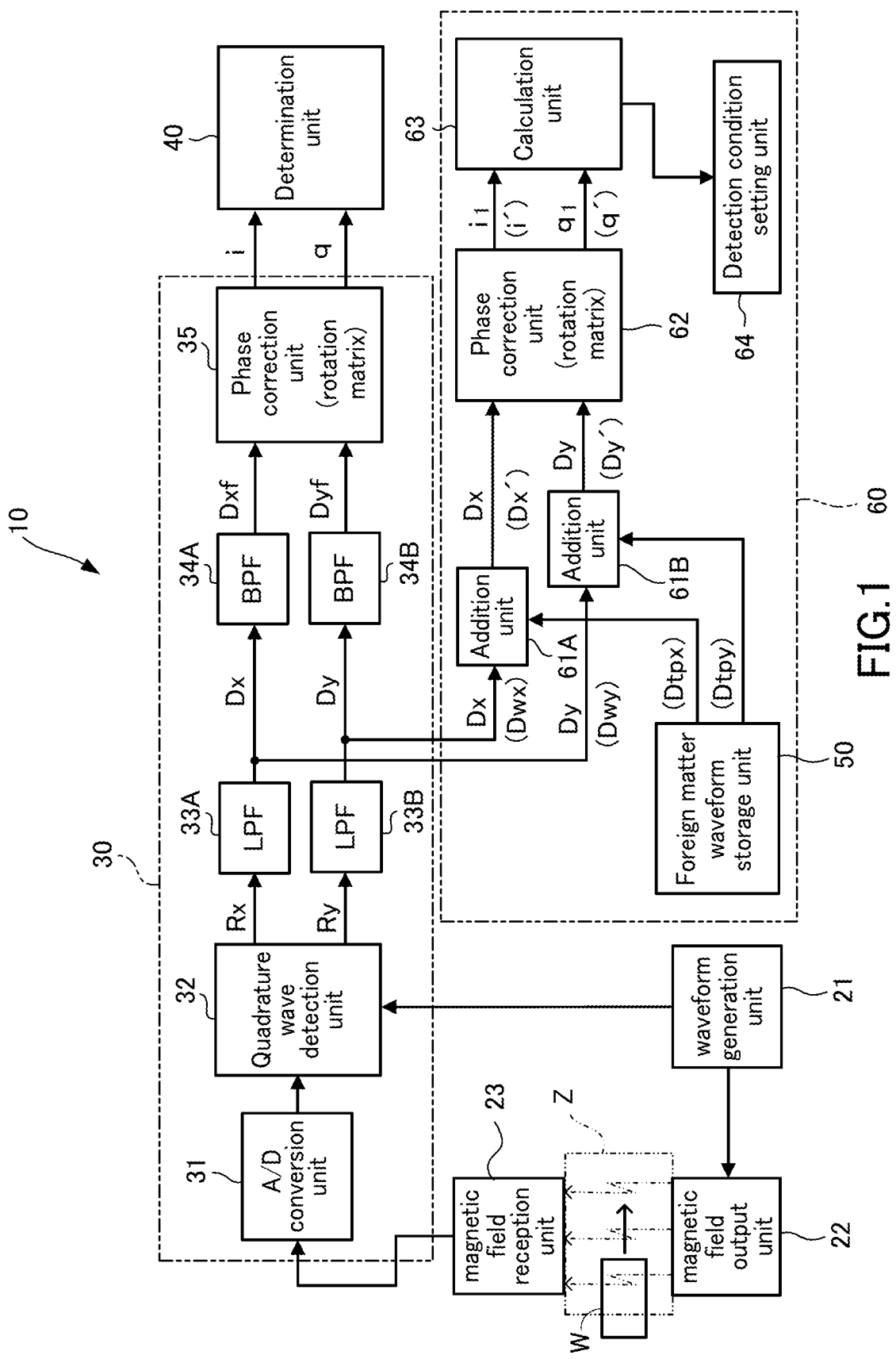
FIG. 1 is a schematic block configuration diagram of a metal detection apparatus according to an embodiment of the present invention.

In a metal detection apparatus 10 of the present embodiment showing the schematic configuration as a whole in FIG. 1, while the workpiece W as an article to be inspected is being conveyed by a conveyor (not shown), the workpiece W passes through an inspection zone Z that is a predetermined space in which an alternating magnetic field is generated, wherein metal in the workpiece W (herein the term "metal" means a foreign matter consisting of a metal or a foreign matter including a metal component, in the case of missing item detection, constituent elements of the workpiece W, not the foreign matter) is detected by detecting a magnetic field variation in the inspection zone Z when the workpiece W passes through the inspection zone Z. Further, in the vicinity of the entrance of the inspection zone Z, an article detection sensor (not shown in FIG. 6) for detecting entry of the workpiece W into the inspection zone Z is installed.

The workpiece W is, for example, a mass-produced food packaged in a packaging material, which can be a fixed form product such as a boxed product, an irregular form product such as a flexible bag-containing product filled with a fluid material, or a frozen product. It is needless to say that the workpiece W is not limited to food.

The metal detection apparatus 10 includes: a waveform generation unit 21 that generates a magnetic field transmission signal and a detection signal of a preset frequency; a magnetic field output unit 22 (magnetic field generation unit) that generates an alternating magnetic field in the inspection zone Z based on the magnetic field transmission signal from the waveform generation unit 21; a magnetic field reception unit 23 (magnetic field detection unit) that receives the magnetic field in the inspection zone Z and outputs a magnetic field variation signal at the time when the workpiece W passes through the inspection zone Z; a detection circuit unit 30 that takes in the magnetic field variation signal from the magnetic field reception unit 23 and performs a plurality of signal processes for metal detection; and a metal detection determination unit 40 (determination unit) that determines a presence of metal foreign matter or metal component in the workpiece W based on the detection signal processed by the detection circuit unit 30.

Although not shown in detail, the waveform generation unit 21 includes, for example, a frequency-switchable reference signal generating circuit, a signal level adjusting circuit, and an amplifier circuit, so that a transmission signal for generating the alternating magnetic field by the magnetic field output unit 22 and the detection signal for causing the detection circuit unit 30 to perform a quadrature detection process to be described later are output, at least when the fact that the workpiece W is going to enter into the inspection zone Z is detected by the aforementioned article detection sensor.

The magnetic field output unit 22 has a magnetic field generation transmission coil 22a (See FIG. 2) arranged in the vicinity of a conveyance path of the workpiece W by a conveyor (not shown) and a tuning circuit, thereby making it possible to generate the alternating magnetic field set in the inspection zone Z through exciting the magnetic field generating transmission coil 22a in accordance with the alternating signal from the waveform generation unit 21.

The magnetic field reception unit 23 is configured to receive the alternating magnetic field from the magnetic field output unit 22 and to detect the variation of the magnetic field when the workpiece W passes through the inspection zone Z. The magnetic field reception unit 23 comprises, for example, a pair of reception coils, a tuning capacitor, a sensitivity adjusting variable resistor, and the like.

Figure 2:
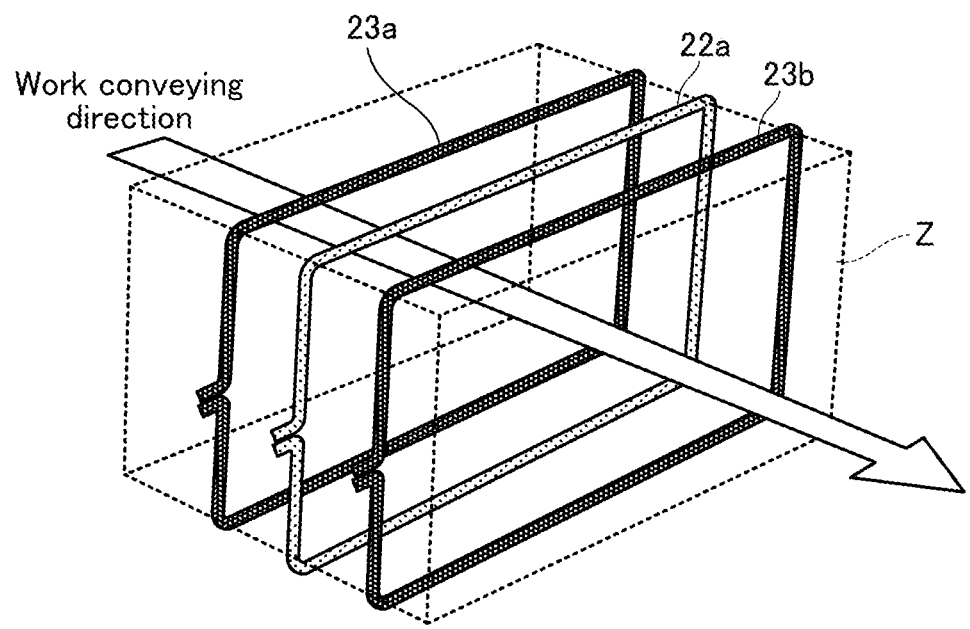
FIG. 2 is a schematic perspective view showing an arrangement form of a magnetic field generating transmission coil and a magnetic field reception coil in a detection head in a metal detection apparatus according to an embodiment of the present invention.

As shown in FIG. 2, the magnetic field output unit 22 has a magnetic field generation transmission coil 22a which surrounds the workpiece conveyance path in the vicinity of the center of the inspection zone Z in the workpiece conveyance direction, and the magnetic field reception unit 23 has a pair of reception coils 23a and 23b which are disposed on both sides of the magnetic field generating transmitting coil 22a in the conveyance direction, while surrounding the workpiece conveyance path. The magnetic field generating transmitting coil 22a and the pair of reception coils 23a and 23b are accommodated in a detection head (not shown), and the pair of reception coils 23a and 23b are differentially connected like a differential detector.

In this case, in a normal state, the magnetic flux generated from the magnetic field generating transmitting coil 22a is evenly interlinked to the pair of reception coils 23a and 23b, so that the induced voltages of the pair of reception coils 23a and 23b are balanced, thereby making the differential outputs (induced voltages) from the reception coils 23a and 23b zero. It should be noted that the detection head has an opening corresponding to the inspection zone Z formed therein so as to penetrate through the detection head in the workpiece conveying direction.

When the balance state of the differential outputs at both the reception coils 23a and 23b is broken due to the movement of the workpiece W in the inspection zone Z, the magnetic field reception unit 23 can output a reception signal (hereinafter referred to as the "magnetic field variation signal") corresponding to a variation of the magnetic field. The magnetic field variation signal constitutes a signal form in which a low frequency signal component corresponding to a magnetic field variation accompanying the passage of the workpiece W is superimposed on an AC signal component having a magnetic field frequency band corresponding to the alternating magnetic field from the magnetic field output unit 22 side.

The detection circuit unit 30 that takes in the reception signal from the magnetic field reception unit 23 includes an A/D conversion unit 31, a quadrature detection unit 32, one and the other LPF (low-pass filter) units 33A and 33B, one and the other BPF (band-pass filter) units 34A and 34B, and a first phase correction unit 35.

Although a detailed hardware configuration is not shown, the detection circuit unit 30 constitutes a part of a control unit of a computer configuration including a CPU, a RAM, a ROM, and an input/output interface circuit, for example, so that each function of the detection circuit unit 30 to be described below can be exerted by executing various control programs stored in the ROM by the CPU. In addition to the CPU, the detection circuit unit 30 may also include a DSP (Digital Signal Processor) and a FPGA (Field Programmable Gate Array) that perform digital signal processing.

The A/D conversion unit 31 samples the analog reception signal from the magnetic field reception unit 23 at a predetermined sampling interval and outputs digital reception signals discretized to a plurality of sampling points. It should be noted that the sampling interval referred to here is set to a necessary and sufficient interval value for performing a plurality of processes for metal detection and adjustment of detection conditions to be described later, and the sampling interval may be set to a time corresponding to a predetermined displacement distance of the workpiece W in the conveyance direction in the inspection zone Z.

The quadrature wave detection unit 32 generates a digital quadrature wave detection signal constituted by a signal Rx and a signal Ry whose phases differ from each other by 90°, by performing a mixing process which is equivalent to a multiplication of a cosine wave and a sine wave having a relative phase of 90° with respect to the digital reception signal input from the A/D conversion unit 31, based on the detection signal from the waveform generation unit 21.

One and the other LPF units 33A and 33B extract high frequency components corresponding to the frequency band of the alternating magnetic field based on the transmission signal from the signal Rx and the signal Ry of the relative phase of 90° output from the quadrature wave detection unit 32, to thereby take out the digital signals Dx and Dy of the low frequency signal component having the relative phase of 90° corresponding to the magnetic field variation accompanying the passage of the workpiece W.

The one and the other BPF units 34A and 34B are digital filters capable of generating signals Dxf and Dyf with suppressed influence of external electromagnetic noise and the like from the magnetic field variation signal due to the workpiece W passing through the inspection zone Z, by limiting the passage of a signal out of the predetermined frequency band among the digital signals Dx and Dy of the low frequency signal component. The one and the other BPF units 34A and 34B are constituted, for example, by a FIR (Finite Impulse Response) filter.

The first phase correction unit 35 obtains a series of digital signals Dxf and Dyf of low frequency signal components from the one and the other BPF units 34A and 34B by a predetermined sampling number, and based on the obtained signal data, draws a scatter diagram with the values of the predetermined sampling number of the digital signal Dxf, Dyf at the time when the workpiece W passes through the inspection zone Z as a coordinate component, for example, a Lissajous figure, on the X-Y plane where the phase 0° (in-phase) at detection is the horizontal axis and the phase of 90° (quadrature phase) is the vertical axis. Then, the first phase correction unit 35 sets a phase orthogonal to the reference phase as the determination phase for presence or absence of metal, where the reference phase is the phase in which the amplitude (gain) due to the article influence of the workpiece W in the Lissajous figure is the maximum, and performs a rotation matrix calculation, to thereby correct the phases of the signals Dxf and Dyf so as to eliminate the phase difference of the reference phase with respect to the phase at the detection (corresponding to the difference of the slope angle of the regression line in the scatter diagram), so that an in-phase component signal i, which is corrected to be in-phase with the detection phase and corresponds to the signal Dxf, and a quadrature phase component signal q, which is corrected to be regarded as a quadrature phase of the detection phase corresponding to the signal Dyf, are respectively generated.

In this case, when metal (metal foreign matter or metal component) is contained in the workpiece W, on an I-Q plane, with a reference phase regarded to be in-phase with the detection phase on the horizontal axis, and a quadrature phase of the reference phase on the horizontal axis, in contrast to a flat scatter diagram shape of the article influence signal located in the vicinity of the regression line of the reference phase, the scattered diagram shape of the metal influence signal has a regression line tilted to the determination phase side (for example, in the case of magnetic metal, the side where the phase angle becomes large, and in the case of a nonmagnetic metal, the side where the phase angle becomes small), and in the quadrature phase which is the determination phase of the presence of metal, the amplitude level of the in-phase component signal i having a large article influence becomes the minimum level, while the amplitude level of the quadrature phase component signal q having a large metal influence becomes relatively large.

Thus, the detection circuit unit 30 takes in the magnetic field variation signal output from the magnetic field reception unit 23 when the workpiece W passes through the inspection zone Z, executes a plurality of signal processing, detects a first variation component having a large influence of the workpiece W (influence of an article to be inspected not including metal) among the magnetic field variation signal and a second variation component having a large influence of the metal among the magnetic field variation signal are respectively detected with different detection phases, and outputs the in-phase component signal i mainly including the first variation component and the quadrature phase component signal q mainly including the second variation component, as detection signals for use in the determination of metal presence or absence.

The metal detection determination unit 40 compares the variation range (amplitudes) of the two component signals i and q in the metal presence or absence determination phase, for example, on the I-Q plane, based on the detection signals obtained as a result of the signal processing by the detection circuit unit 30, which are the in-phase component signal i and the quadrature phase component signal q respectively output from a first phase correction unit 35 by the predetermined sampling number, and determines the presence or absence of metal in the workpiece W, depending on whether or not the ratio of the variation range exceeds a predetermined limit value.

The metal detection apparatus 10 further includes a foreign matter waveform storage unit 50 (metal influence signal storage unit) having test data (hereinafter referred to as the "test variation component") accompanied by a time variation equivalent to the second variation component caused by the metal influence in the magnetic field variation signal, for example, a foreign matter waveform, preliminarily stored therein, and a detection condition adjustment unit 60 capable of adjusting a condition of metal detection by adjusting a condition of one of the plurality of signal processes in the detection circuit unit 30 in cooperation with the foreign matter waveform storage unit 50.

The test data stored in the foreign matter waveform storage unit 50 is data stored as the test variation components Dtpx, Dtpy equivalent to the second variation component by metal influence among the magnetic field variation signals, after obtaining the digital signals Dx, Dy of low frequency signal components of relative phase of 90° output from the one and the other LPF unit 33A, 33B when a metal test piece is passed through the inspection zone Z in advance, by a predetermined number of samples sufficient for drawing the aforementioned scatter diagram, or preferably more.

The detection condition adjustment unit 60 includes addition units 61A, 61B and a second phase correction unit 62, the addition units 61A, 61B being capable of adding the test variation components Dtpx, Dtpy input from the foreign mater waveform storage unit 50 to the digital signals Dx, Dy of low frequency signal components of relative phase of 90° output from the one and the other LPF unit 33A, 33B in a specific operation mode (for example, an article type setting mode, a maintenance mode, a sensitivity setting mode, or the like) in which the detection sensitivity of the metal detection apparatus 10 is adjustable, the second phase correction unit 62 acquiring the addition signals Dx', Dy' having the relative phase of 90° from the addition units 61A, 61B by a predetermined sampling number and executing a rotation matrix calculation similar to that of the first phase correction unit 35. By executing a rotation matrix calculation similar to that of the first phase correction unit 35, the second phase correction unit 62 can generate an in-phase component signal i' which is corrected to be regarded to be in the same phase with the detection phase corresponding to the signal Dx' and the quadrature phase component signal q' corrected to be regarded as the quadrature phase of the detection phase corresponding to the signal Dy'.

The detection condition adjustment unit 60 further includes a calculation unit 63 that performs an arithmetic processing for adjusting a condition for one of the plurality of signal processes in the detection circuit unit 30, for example, the properties of the one and the other BPF units 34A, 34B, based on the in-phase component signal i' and the quadrature phase component signal q' from the phase correction unit 62, and a detection condition setting unit 64 that variably sets the properties of the one and the other BPF units 34A, 34B according to the processing result of the calculation unit 63.

To be specific, the calculation unit 63 cooperates with the foreign matter waveform storage unit 50, the addition units 61A, 61B, and the second phase correction unit 62 under the aforementioned specific operation mode, and switches between a state in which the test variation component Dtpx, Dtpy are allowed to be input to the addition unit 61A, 61B from the foreign matter waveform storage unit 50 and a state in which the test variation component Dtpx, Dtpy are not allowed to be input to the addition unit 61A, 61B from the foreign matter waveform storage unit 50, while a test (sensitivity setting test operation) for passing only non-defective workpiece W (aricle to be inspected metal) through inspection region Z is conducted for a predetermined number of times.

By this configuration, in a case in which the calculation unit 63 allows only the digital signals Dwx, Dwy, having a large article influence output from the one and the other LPF unit 34A, 34B when only the good workpiece W passes through the inspection zone to be input to the addition unit 61A, 61B and then allows the digital signals Dwx, Dwy, to be input to the second addition unit 61A, 62B as signals Dx, Dy, the calculation unit 63 can calculate the in-phase component signal i1 and the quadrature phase component signal q1. On the other hand, in a case in which the calculation unit 63 allows the signals Dx', Dy', which are obtained by adding, by the addition unit 61A, 61B, the test variation components Dtpx, Dtpy to the digital signals Dwx, Dwy, which are low frequency components when only good workpiece W passes through the inspection zone Z, to be input to the second phase correction unit 62, the calculation unit 63 can calculate the in-phase component signal i' and the quadrature phase component signal q' corresponding to the addition signals Dx', Dy'.

Further, the calculation unit 63 executes a filter function calculation, which is equivalent to the filter processes of the one and the other BPF unit 34A, 34B yet to be executed, multiple times, while sequentially switching to different coefficient values according to a switching condition of filter coefficients stored in advance, based on a series of the in-phase component signals i1 and the quadrature phase component signal q1 respectively of the predetermined number and a series of the in-phase component signals i' and the quadrature phase component signal q' respectively of the predetermined number.

The filter coefficients referred to here are weighting parameters given to the n multipliers in the BPF units 34A and 34B, for example, a combination of a plurality of coefficients as represented by h (0), h (1), h (2), ..., H (n−1). Also, the number n of multipliers is equal to or less than the aforementioned predetermined sampling number. A plurality (for example, n−1) of multipliers in each of the BPF unit 34A, 34B constitute a plurality of taps together with the corresponding delay elements (Z−1 delay elements). Since the configuration itself of such a digital filter (FIR filter in this case) is well known, a detailed description thereof will be omitted.

The calculation unit 63, based on the results of performing a plurality of filter calculations with the plurality of filter coefficients switched as described above, selects a filter coefficient so that the ratio of the variation range of the quadrature phase component signal q' which is the predetermined number of metal influence signals becomes the maximum, with respect to the variation range of predetermined sampling number of the quadrature component signals q1, q' at the metal presence or absence determination phase, where a phase in which the amplitude of a series of in-phase component signals i1 of a predetermined sampling number becomes maximum is set as a reference phase, and a phase orthogonal to the reference phase is set as a metal presence or absence determination phase, and then, the calculation unit 63 outputs the filter coefficient to the detection condition setting unit 64 as a new filter coefficient.

This means that the detection condition adjustment unit 60 can adjust the filter property of each BPF 34A, 34B which constitutes a part of the detection condition of the detection circuit unit 30, based on the signals Dwx and Dwy (first variation component) having a large article influence based on the magnetic field variation signal when only the workpiece W passes through the inspection zone Z and the foreign matter waveform storage (second variation component) read out from the unit 50.

Further, the detection condition adjustment unit 60 regards the phase in which the amplitude of the magnetic field variation component due to article influence is the maximum as in-phase with the detection phase, sets the quadrature phase as the metal presence or absence determination phase, detects the first variation components which are the magnetic field variation component at the time when only the work W passes through the inspection zone Z, respectively as a series of the in-phase component signals i1 and quadrature phase component signals q1 of a predetermined sampling number, detects the magnetic field variation signals in the case that the metal influence of the test piece is added to the signals of the article influence, respectively as a series of the in-phase component signals I' and the quadrature variation signals q', estimates the detection sensitivity of the metal by comparing the variation range of the in-phase component signals I' and the quadrature variation signals q' in the metal presence or absence determination phase on the I-Q plane, based on these digital first and second variation components, and variably sets the filter property of each of the BPF units 34A, 34B so that the detection sensitivity is equal to or larger than a predetermined sensitivity value.

Figure 3:
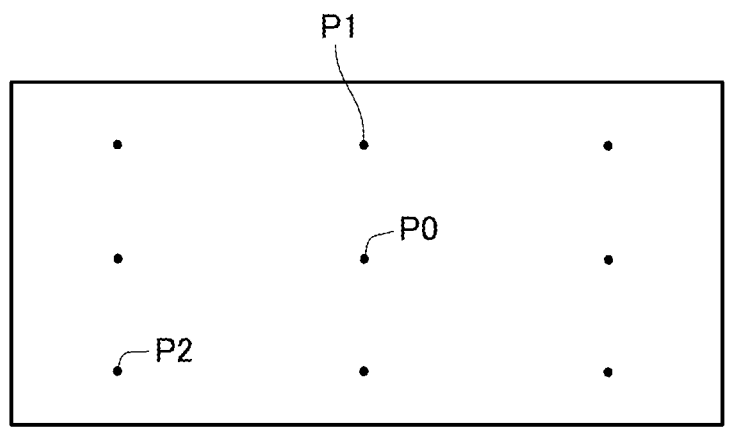
FIG. 3 is an explanatory diagram of measurement conditions of an example of a plurality of test variation components stored in a metal influence signal storage unit of a metal detection apparatus according to an embodiment of the present invention, in which a test piece corresponding to a plurality of test variation components Passes through the predetermined inspection zone is spaced apart from each other in the cross section seen in the article conveying direction.

Further, as shown in a transverse section area at a predetermined position in the pass direction in the inspection zone Z in FIG. 3, the foreign matter waveform storage unit 50 stores metal influence data corresponding to the respective magnetic field variation signals when the test piece passes a plurality of different pass positions P0, P1, P2 and the like (the black circle position in the figure). This means that the detection condition adjustment unit 60 generates a plurality of pseudo magnetic field variation signals in the case that the workpiece W includes metal, by adding the second variation component, based on the respective magnetic field variation signals at the time when the test piece passes a plurality of pass positions P0, P1, P2, to the first variation component at the time when only the workpiece W passes the corresponding pass.

By this configuration, numerous simulations using many pseudo magnetic field variation signals simulating various contamination forms of various metallic foreign substances can be performed, by a simple test to pass a good workpiece W several times through inspection zone Z, so that required high detection sensitivity can be set.

The plurality of pass positions P0 to P2 and the like can be spaced apart in at least one of the directions of a passing direction of the workpiece W, a vertical direction in the inspection zone Z and a horizontal direction in the inspection zone Z. The plurality of pass positions are spaced apart in the passing direction of the workpiece W in a case where a plurality of sampling sections of a predetermined sampling number are set in the inspection zone Z. However, by changing the sampling interval with respect to the change in the conveyance speed or the length of the workpiece W, it is possible to set the inspection zone Z constantly in the sampling section of the predetermined sampling number.

Figure 4:
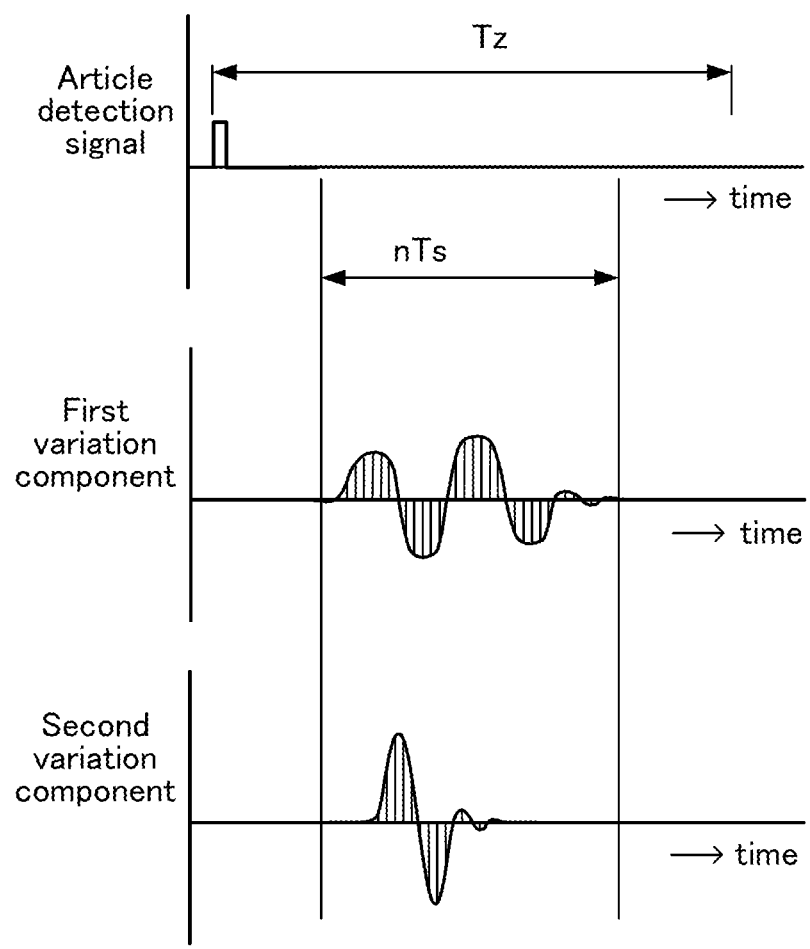
FIG. 4 is a diagram showing a relationship between a predetermined conveyance period during which a workpiece is conveyed after the workpiece is detected and a period during which the first variation component and the second variation component in the magnetic field variation signal are sampled in the metal detection apparatus according to the embodiment of the present invention.

As shown in FIG. 4, in the present embodiment, the sampling section nTs of the magnetic field variation frequency (the first variation component and the second variation component in FIG. 4), in which a predetermined number n of samples are obtained at a sampling interval of Ts, is set to be shorter than the time Tz from the time when the article detection sensor detects that the workpiece W has entered onto the conveyor of the metal detection apparatus 10 until the time when the workpiece W has passed the conveyor, but this sampling section nTs or a plurality of sampling sections nTs can be set, for example, to a time period that the workpiece W passes through the aforementioned detection head or a time slightly longer than said time period. Needless to say, it is possible to set the nTs to a sampling section of the time period from the time when the front end of the workpiece W enters into the inspection zone Z until the time when the rear end of the workpiece W passes the inspection zone Z.

Figure 5A:
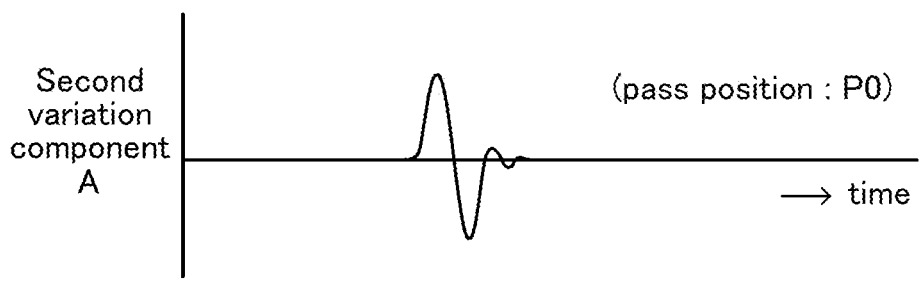
FIG. 5A to 5C are explanatory views of a plurality of test variation components stored in a metal influence signal storage unit of a metal detection apparatus according to an embodiment of the present invention.
Figure 5B:
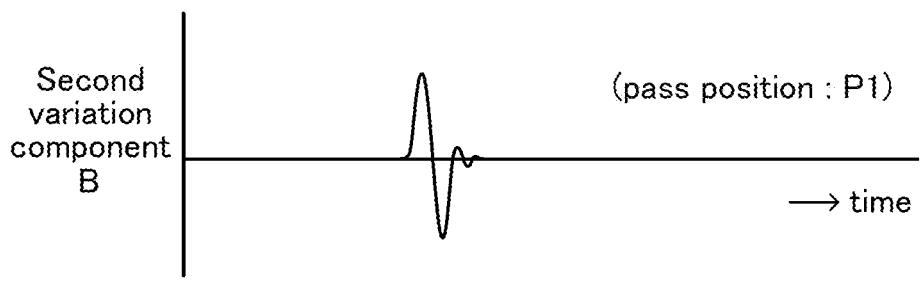
Figure 5C:
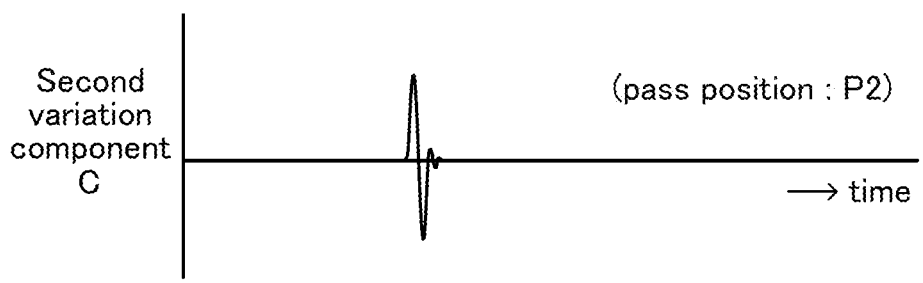

As shown in schematic diagrams of FIGS. 5A to 5C, when the same test piece passes through a plurality of pass positions P0, P1 and P2, the detection waveform differs and a test variation component of a predetermined number of samples Dtpx, Dtpy changes like, for example, the second variation components A, B, C as shown in FIGS. 5A to 5C.

The foreign matter waveform storage unit 50 may store metal influence data in a plurality of types of test pieces having different metal species or different sizes, in which case, for example, an iron based test piece, a stainless steel-based test piece, a copper-based test piece, or the like can be used.

Even though a phase peculiar to the respective metal species differs by metal species, the variation range of the first variation component is the minimum and the phase particular to each metal species incline to the side of the quadrature phase in the quadrature phase that constitutes the metal presence or absence determination phase on an I-Q plane that a phase in which the variation range of the first variation component having a large article influence is the largest is the in-phase. Therefore, by variably setting the filter properties of the BPF units 34A, 34B which influence the frequency band of the detection signal by the detection circuit unit 30, it is possible to precisely set the frequency band having a large influence of the article and to make the noise component smaller than the article influence while making the metal influence larger than the noise component.

Further, the detection condition adjustment unit 60 requests the waveform generation unit 21 to switch the magnetic field transmission signal by the detection condition setting unit 64 under the specific operation mode in which the test is conducted, has the frequency of the magnetic field transmission signal and the detection signal from the waveform generation unit 21 switched, in a few times of the tests of the good workpiece W, and selectively sets an alternating magnetic field frequency in which the amplitude level of the first variation component based on the magnetic field variation signal at the time when only the workpiece W passes through the inspection zone Z is increased, from among a plurality of magnetic field frequencies set in advance.

Furthermore, the foreign matter waveform storage unit 50 can additionally store the metal influence data corresponding to the magnetic field variation signal at the time when a new test piece passes through the inspection zone, and the detection condition adjustment unit 60 can additionally store the property in which an estimated value of the aforementioned detection sensitivity is equal to or greater than a predetermined value, as a filter property of one and the other BPF units 34A, 34B and as a selectable setting property, and can select the property in which the estimated value of the detection sensitivity is the greatest, from among a plurality of filter properties, at the time of the article type setting or the like.

Next, the operation will be described.

In the metal detection apparatus of the present embodiment configured as described above, a state in which the test variation components Dtpx, Dtpy are input from the foreign matter waveform storage unit 50 to the addition units 61A, 61B or a state otherwise is switched, while a predetermined number of tests for passing only good workpieces W through the inspection zone Z are conducted in the above-described specific operation mode in which the detection sensitivity can be set.

Then, a test for passing only good workpieces W through the inspection zone Z is conducted in a state in which the test variation components Dtpx, Dtpy are not input from the foreign matter waveform storage unit 50 to the addition units 61A, 61B, thereby, the in-phase component signal i1 and the quadrature phase component signal q1 are calculated where the signals Dx and Dy include only the digital signals Dwx and Dwy having a large article influence.

Subsequently, the test of passing only the good workpieces W in the inspection zone Z is conducted again under the state in which the test variation components Dtpx, Dtpy are input from the contaminant waveform storage unit 50 to the addition units 61A, 61B, so that the signals Dx', Dy' obtained by adding the test variation components Dtpx, Dtpy having a large metal influence to the digital signals Dwx, Dwy of the low frequency signal component having a large article influence are input to the second phase correction unit 62, thereby, the in-phase component signal i' and the quadrature phase component signal q' corresponding to the addition signals Dx' and Dy' are calculated.

At this time, while conducting only the test of passing the good workpiece W through the inspection zone Z, many pseudo magnetic variation signals simulating various contamination forms of various metal foreign matters are generated, numerous simulation calculations using the generated pseudo magnetic variation signals are executed promptly, so that the required high detection sensitivity is set within a short time.

To be specific, at this time, a series of digital signals Dwx, Dwy each having a predetermined sampling number accompanying temporal change are input to the addition units 61A and 61B, and a series of test variation components Dtpx and Dtpy of a predetermined sampling number accompanying temporal change are added, in order to adjust the properties of the digital filters corresponding to the filter properties of the respective BPF units 34A and 34B having a plurality of taps (delay blocks).

Then, a series of pulsed signals Dx' and Dy' which are the addition signals are input to the second phase correction unit 62, where the in-phase component signal i' and the quadrature phase component signal q', corresponding to the addition signals Dx' and Dy', are calculated.

Figure 6:
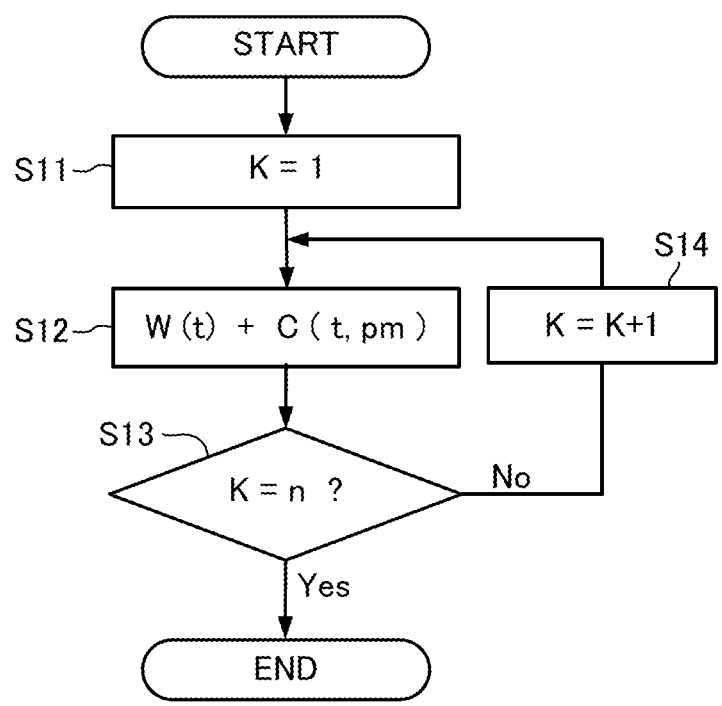
FIG. 6 is a flowchart showing an outline flow of a program for generating a plurality of pseudo magnetic field variation signals for setting a high detection sensitivity in a metal detection apparatus according to an embodiment of the present invention.

FIG. 6 shows a schematic procedure of a process for calculating a series of addition signals Dx' and Dy' of a predetermined sampling number.

In the figure, W (t) represents a signal at a certain time (t) of an arbitrary one of a series of digital signals Dwx and Dwy having a sampling number n with a large article influence (hereinafter referred to as the "article influence signal"). C (t, pm) in the figure represents a signal (hereinafter referred to as the "metal influence signal") of an arbitrary one of a series of test variation components Dtpx, Dtpy of sampling number n with large metal influence at a certain time(t) and at the pass position (any one of P0, P1, P2, etc.). "m" is a subscript equivalent value at the pass position P0, P1, P2, and the like.

As shown in FIG. 6, first, the number K of addition process is set to 1 at the first time (step S11), and then the article influence signal W(t) at the first time and the metal influence signal C(t, pm) is added (step S12).

Next, whether or not the number of additions K has reached n is determined (step S13). If n has not been reached (No in step S13), after the number of additions K has been incremented (step S14), for example, the article influence signal W(t) and the metal influence signal C(t, pm) at the time one sample earlier are added (step S 12).

The same process (steps S 12 to S 14) is iterated until the number of additions K reaches n, and when the number of additions K reaches n (Yes in step S 13), the current processing is terminated.

Through such processing, a series of addition signals Dx', Dy' of plural kinds, obtained by adding a series of plural kinds of test variation components Dtpx, Dtpy to the series of digital signals Dwx, Dwy are calculated, so that many pseudo magnetic field variation signals are generated.

Thus, in the present embodiment, the test variation component with time variation having a large metal influence at the time when only the metal test piece passes through the inspection zone Z is stored in the foreign matter waveform storage unit 50 in advance, the filter coefficients of the BPF units 34A and 34B are variably set by the detection condition adjustment unit 60, based on a series of digital signals Dwx, Dwy (first variation component) having a large product influence when only the workpiece W passes through the examination area Z and the test variation components Dtpx, Dtpy (second variation component) read out from the foreign matter waveform storage unit 50, thereby, the specific processing conditions of the detection processing in the detection circuit unit 30 are adjusted.

Therefore, when a product to be a workpiece W for the article type setting or the like is fed into the inspection zone, the first variation component is obtained by the detection condition adjustment unit 60 based on the magnetic field variation signal at the time when only the workpiece W passes through the inspection zone, and the second variation component based on the magnetic field variation signal at the time when the test piece is used is obtained by the detection condition adjustment unit 60 from the magnetic field variation signal corresponding to the metal influence data read out from the foreign matter waveform storage unit 50. Then, the detection phase of the first and second variation component is adjusted and set to the required detection sensitivity by the detection condition adjustment unit 60, so that the amplitude level of the second variation component is larger with respect to the amplitude level of the first variation component. Therefore, it is possible to quickly and accurately set the detection sensitivity capable of meeting the high detection sensitivity requirement by only a small number of tests of only the article without repeating the test of using the article and the test piece together, and it is possible to achieve both the securing of the required detection sensitivity and the reduction of the number of tests for setting the detection sensitivity.

Further, in the present embodiment, since the detection condition adjustment unit 60 estimates the metal detection sensitivity at a predetermined metal presence or absence determination phase, and variably sets the filter properties of the BPF units 34A and 34B so that the estimated value of the detection sensitivity is equal to or higher than a preset sensitivity value, stable and favorable detection sensitivity can be secured by ensuring the amplitude level of the magnetic field variation component due to the article influence.

Furthermore, in the present embodiment, since the foreign matter waveform storage unit 50 stores the respective metal influence data at the time when the test piece passes a plurality of different pass positions in the inspection zone Z, and the detection condition adjustment unit 60 generates a plurality of pseudo magnetic field variation signals in the case that the workpiece W includes metal by adding the second variation component based on metal influence data on a plurality of pass positions to the first variation component at the time when the workpiece W is in the corresponding pass section, it is possible to stably set detection sensitivity even though the size and position of the metal to be detected cannot be predicted.

In addition, in the present embodiment, since the plurality of pass positions P0, P1, P2, and the like are spaced apart in at least one of the passing directions of the workpiece W, the vertical direction in the inspection zone Z, and the horizontal direction in the inspection zone Z, in the case that the tendency of the position of the metal to be detected can be predicted, the metal influence data using the test piece can be prepared in advance for the plurality of pass positions in the specific direction corresponding thereto, and the tendency of the position of the metal to be detected is predicted, and even in the case that the tendency of the position of the metal to be detected cannot be predicted, it is possible to set stable and favorable detection sensitivity for every contamination form of metallic foreign matter by isotropically dispersing a plurality of pass positions P0, P1, P2 and the like in the inspection zone Z.

Further, in the present embodiment, since metal influence data for a plurality of types of test pieces having different metal species or different sizes can be stored in the foreign matter waveform storage unit 50, it is possible to set the stable and favorable detection sensitivity, even though the species of the metal to be detected changes or cannot be predicted.

Furthermore, since the alternating magnetic field frequency is selected from among a plurality of magnetic field frequency values so that the amplitude level of the first variation component based on the magnetic field variation signal at the time when only the workpiece W passes through the inspection zone Z increases, it is possible to select a magnetic field frequency having a large metal influence in the magnetic field variation signal, thereby making it possible to set a stable and more favorable detection sensitivity. Further, it is possible to set a stable and more favorable detection sensitivity even in the case that the magnetic field frequency suitable for detecting the second variation component differs depending on whether the metal is magnetic or not.

Further, in the present embodiment, since metal influence data corresponding to the magnetic field variation signal at the time when a new test piece passes through the inspection zone Z can be additionally stored in the foreign matter waveform storage unit 50, it is possible to additionally store a property in which an estimated value of the detection sensitivity is equal to or larger than a predetermined value as a selectable property, so that the property in which the estimated value of the detection sensitivity is the maximum value from among the plurality of filter properties can be selected, thereby making it possible to respond quickly and accurately to a new detection sensitivity request corresponding to a new test piece.

Thus, in the present embodiment, it is possible to provide a metal detection apparatus 10 that is capable of quickly and accurately performing the setting of the high detection sensitivity in consideration of the frequency, the phase, and the like of the variation component due to the article influence and the variation component due to the metal influence in the magnetic field variation signal, and of achieving both the securing of the required detection sensitivity and the reduction of the number of tests for setting the detection sensitivity.

In the above-described one embodiment, the output of the magnetic field reception unit 23 is taken into the A/D conversion unit 31, and each process after the quadrature detection is performed as digital processing, but the quadrature wave detection unit 32 and the LPF units 33A, 33B may otherwise be implemented by analog processing. However, as explained in the above-described embodiment, the wave detection by the quadrature wave detection unit 32 may also be implemented by digital processing, so that it can be easily be realized that the wave detection phase can be timely and accurately adjusted according to the article influence.

Further, in the above-described one embodiment, a part of the detection condition of the detection circuit unit 30 is set as a specific processing condition, for example, a filter coefficient, in the detection processing in the detection circuit unit, but the part of the detection condition of the detection circuit unit 30 may otherwise be another condition that changes the filter characteristic or other specific processing conditions related to the conditions of the phase adjustment and the like.

Furthermore, it is needless to say that the apparatus configurations in the above-described embodiment such as the shape and arrangement of the coils of the magnetic field output unit 22 and the magnetic field reception unit 23, the presence or absence of a conveyor, and the like are not particularly limited. In addition, in the above-described one embodiment, the present invention has been described as a metal detector for generating an alternating magnetic field in an inspection zone and detecting magnetic field variation due to passage of the work. However, the present invention is not limited to this, but the present invention includes an application to store the metal influence data in advance in a metal detector of another type, such as a metal detector in which a workpiece entering the inspection zone is magnetized beforehand with an electromagnet, a permanent magnet, or the like, and metal is detected on the basis of an output from a magnetic sensor provided in the detection head, for example, outputs from a plurality of magnetic sensors.

As described above, the present invention can provide a metal detection apparatus that is capable of quickly and accurately performing the setting of the high detection sensitivity in consideration of the frequency, the phase, and the like of the variation component due to the article influence and the variation component due to the metal influence in the magnetic field variation signal, and of achieving both the securing of the required detection sensitivity and the reduction of the number of tests for setting the detection sensitivity, and the present invention is useful in a metal detection apparatus in general that detects metal or metal component included in the article to be inspected based on the magnetic field variation at the time when the article to be inspected passes through the alternating magnetic field.

EXPLANATION OF REFERENCE NUMERALS

10 metal detection apparatus
21 waveform generation unit 22 magnetic field output unit (magnetic field generation unit)
22a magnetic field generation transmitting coil
23 magnetic field reception unit (magnetic field detection unit)
23a, 23b reception coil
30 detection circuit unit (magnetic field detection unit)
31 A/D converter (analog/digital converter)
32 quadrature wave detection unit
33A, 33B LPF unit (low pass filter unit)
34A, 34B BPF unit (band pass filter unit)
35 first phase correction unit
40 metal detection determination unit (determination unit)
50 foreign matter waveform storage unit (metal influence signal storage unit)
60 detection condition adjustment unit
61A, 61B addition unit
62 second phase correction unit
63 calculation unit
64 detection condition setting unit
Dtpx, Dtpy test variation component (second variation component)
Dwx, Dwy digital signal (first variation component)
Dx, Dy digital signal
Dx', Dy' addition signal (pseudo magnetic field variation signal)
i, i1, i' in-phase component signal
P0, P1, P2 pass position
q, q1, q' quadrature phase component signal
W workpiece (article to be inspected)
Z inspection zone

The invention claimed is:

1. A metal detection apparatus, comprising:
a magnetic field generator that generates an alternating magnetic field in an inspection zone through which an article to be inspected passes;
a magnetic field detector that detects a variation of the alternating magnetic field at the time when the article to be inspected passes through the inspection zone and outputs a magnetic field variation signal; and
at least one circuit configured to:
perform a detection process of detecting a first variation component of the magnetic field variation signal being predominantly influenced by the article to be inspected and a second variation component of the magnetic field variation signal being predominantly influenced by metal, respectively in a different phase;
compare the detected first variation component and the detected second variation component, and perform a determination process for metal detection in the article to be inspected; and
adjust a condition of the detection process of each of the first variation component and the second variation component, wherein:
the metal detection apparatus further comprises a metal influence signal storage unit that stores in advance a test variation component of the magnetic field variation signal accompanying a temporal change due to an influence of a test piece in the magnetic field variation signal at the time when only the test piece of the metal passes through the inspection zone, and
the at least one circuit is further configured to set a specific process condition of the detection process, based on the first variation component based on the magnetic field variation signal at the time when the article to be inspected passes through the inspection zone and the second variation component constituted by the test variation component read out from the metal influence signal storage.

2. The metal detection apparatus according to claim 1, wherein
the at least one circuit comprises a filter that removes a noise component from a detection signal of the magnetic field variation signal, and
the at least one circuit is further configured to estimate a detection sensitivity of the metal based on the first variation component based on the magnetic field variation signal at the time when the article to be inspected passes through the inspection zone and the second variation component based on the magnetic field variation signal in a case where a test piece is used as the metal, in a predetermined metal presence or absence determination phase, and variably set a property of the filter so that an estimated value of the detection sensitivity is equal to or larger than a sensitivity value set in advance.

3. The metal detection apparatus according to claim 2, wherein
the metal influence signal storage stores a metal influence data corresponding to the magnetic field variation signals respectively at the time when the test piece passes a plurality of different pass positions in the inspection zone, and
the at least one circuit is further configured to generate a plurality of pseudo magnetic field variation signals in a case that the article to be inspected includes the metal, by adding the second variation component based on the magnetic field variation signals respectively at the time when the test piece passes a plurality of different positions in the inspection zone to the first variation component at the time when the article to be inspected is at pass positions when the test piece passes a plurality of different positions.

4. The metal detection apparatus according to claim 3, wherein the plurality of pass positions are spaced apart in at least one of:
a passing direction of the article to be inspected;
a vertical direction in the inspection zone; and
a horizontal direction in the inspection zone.

5. The metal detection apparatus according to claim 1, wherein the metal influence signal storage stores metal influence data for a plurality of types of test pieces having different metal species or different sizes.

6. The metal detection apparatus according to claim 2, wherein the metal influence signal storage stores metal influence data for a plurality of types of test pieces having different metal species or different sizes.

7. The metal detection apparatus according to claim 3, wherein the metal influence signal storage stores the metal influence data for a plurality of types of test pieces having different metal species or different sizes.

8. The metal detection apparatus according to claim 4, wherein the metal influence signal storage stores the metal influence data for a plurality of types of test pieces having different metal species or different sizes.

9. The metal detection apparatus according to claim 1, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

10. The metal detection apparatus according to claim 2, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

11. The metal detection apparatus according to claim 3, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

12. The metal detection apparatus according to claim 4, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

13. The metal detection apparatus according to claim 5, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

14. The metal detection apparatus according to claim 6, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

15. The metal detection apparatus according to claim 7, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

16. The metal detection apparatus according to claim 8, wherein the at least one circuit is further configured to select and set the frequency of the alternating magnetic field from among a plurality of magnetic field frequency values set in advance, so that an amplitude level of the first variation component based on the magnetic field variation signal increases at the time when the article to be inspected passes through the inspection zone.

17. The metal detection apparatus according to claim 2, wherein the metal influence signal storage is configured to additionally store metal influence data corresponding to the magnetic field variation signal at the time when a new test piece passes through the inspection zone, and the at least one circuit is further configured to additionally store, as a property of the filter, a property in which the estimated value of the detection sensitivity is equal to or larger than the sensitivity value set in advance as a selectable property, and select the property in which the estimated value of the detection sensitivity is the maximum value from among a plurality of properties of the filter.

18. The metal detection apparatus according to claim 3, wherein the metal influence signal storage is configured to additionally store metal influence data corresponding to the magnetic field variation signal at the time when a new test piece passes through the inspection zone, and the at least one circuit is further configured to additionally store, as a property of the filter, a property in which the estimated value of the detection sensitivity is equal to or larger than the sensitivity value set in advance as a selectable property, and select the property in which the estimated value of the detection sensitivity is the maximum value from among a plurality of properties of the filter.

19. The metal detection apparatus according to claim 4, wherein the metal influence signal storage is configured to additionally store metal influence data corresponding to the magnetic field variation signal at the time when a new test piece passes through the inspection zone, and the at least one circuit is further configured to additionally store, as a property of the filter, a property in which the estimated value of the detection sensitivity is equal to or larger than the sensitivity value set in advance as a selectable property, and select the property in which the estimated value of the detection sensitivity is the maximum value from among a plurality of properties of the filter.

* * * * *